United States Patent
Hallenstål

(10) Patent No.: US 11,974,174 B2
(45) Date of Patent: Apr. 30, 2024

(54) FIRST SERVICE COMMUNICATION PROXY NODE, SECOND COMMUNICATION PROXY NODE AND METHODS IN A WIRELESS COMMUNICATION NETWORK

(71) Applicant: Telefonaktiebolaget LM Ericsson (publ), Stockholm (SE)

(72) Inventor: Magnus Hallenstål, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 318 days.

(21) Appl. No.: 17/622,902

(22) PCT Filed: Jun. 27, 2019

(86) PCT No.: PCT/SE2019/050623
§ 371 (c)(1),
(2) Date: Dec. 27, 2021

(87) PCT Pub. No.: WO2020/263139
PCT Pub. Date: Dec. 30, 2020

(65) Prior Publication Data
US 2022/0248275 A1  Aug. 4, 2022

(51) Int. Cl.
*H04W 36/00* (2009.01)
(52) U.S. Cl.
CPC .............. *H04W 36/0033* (2013.01)
(58) Field of Classification Search
CPC . H04W 36/0033; H04W 48/18; H04W 36/14; H04W 8/24
See application file for complete search history.

(56) References Cited

U.S. PATENT DOCUMENTS

2020/0413245 A1* 12/2020 Zhu .................... H04W 8/26

OTHER PUBLICATIONS

International Search Report and Written Opinion of the International Searching Authority, PCT/SE2019/050623, dated Sep. 13, 2019, 9 pages.
3GPP TS 23.502 v16.1.1 (Sep. 2019), $3^{rd}$ Generation Partnership Project; Technical Specification Group Services and System Aspects; Procedures for the 5G System; Stage 2 (Release 16), 495 pages.
NTT Docomo, 3GPP TSG-SA WG2 Meeting #130, S2-1901265, Delegated service discovery from a different PLMN, Jan. 21-25, 2019, Kochi, India, 2 pages.

(Continued)

*Primary Examiner* — Allahyar Kasraian
(74) *Attorney, Agent, or Firm* — Sage Patent Group

(57) ABSTRACT

A method performed by a second SCP node for handling control plane traffic of a service related to a UE is provided. At a relocation of the control plane traffic of the service from a first AMF passing a first SCP node towards a second AMF, the second SCP receives, from the first SCP node, a UE context including a URI of the original resource in a NF. The second SCP then changes the URI of the original resource in the NF to a second URI, in the UE context, which second URI is related to a NF service association. The second SCP node then sends, to the second AMF, the UE context including the second URI, enabling the control plane traffic of the service from the second AMF to pass the second SCP for control plane traffic related to the resource in the NF.

10 Claims, 10 Drawing Sheets

(56) References Cited

OTHER PUBLICATIONS

3GPP TS 29.500 v16.0.0 (Jun. 2019), 3$^{rd}$ Generation Partnership Project; Technical Specification Group Network and Terminals; 5G System; Technical Realization of Service Based Architecture; Stage 3 (Release 16), 36 pages.
3GPP TS 23.501 v16.1.0 (Jun. 2019), 3$^{rd}$ Generation Partnership Project; Technical Specification Group Services and System Aspects; System Architecture for the 5G System; Stage 2 (Release 16), 368 pages.
3GPP TS 23.501 v16.0.2 (Apr. 2019), 3$^{rd}$ Generation Partnership Project; Technical Specification Group Services and System Aspects; System Architecture for the 5G System; Stage 2 (Release 16), 317 pages.
3GPP TS 29.500 v15.3.0 (Mar. 2019), 3$^{rd}$ Generation Partnership Project; Technical Specification Group Core Network and Terminals; 5G System; Technical Realization of Service Based Architecture; Stage 3 (Release 15), 33 pages.
3GPP TS 29.510 v15.3.0 (Mar. 2019), 3$^{rd}$ Generation Partnership Project, Technical Specification Group Core Network and Terminals; 5G System; Network Function Repository Services; Stage 3 (Release 15), 121 pages.
3GPP TS 23.502 v16.0.2 (Apr. 2019), 3$^{rd}$ Generation Partnership Project; Technical Specification Group Services and System Aspects; Procedures for the 5G System; Stage 2 (Release 16), 419 pages.

* cited by examiner

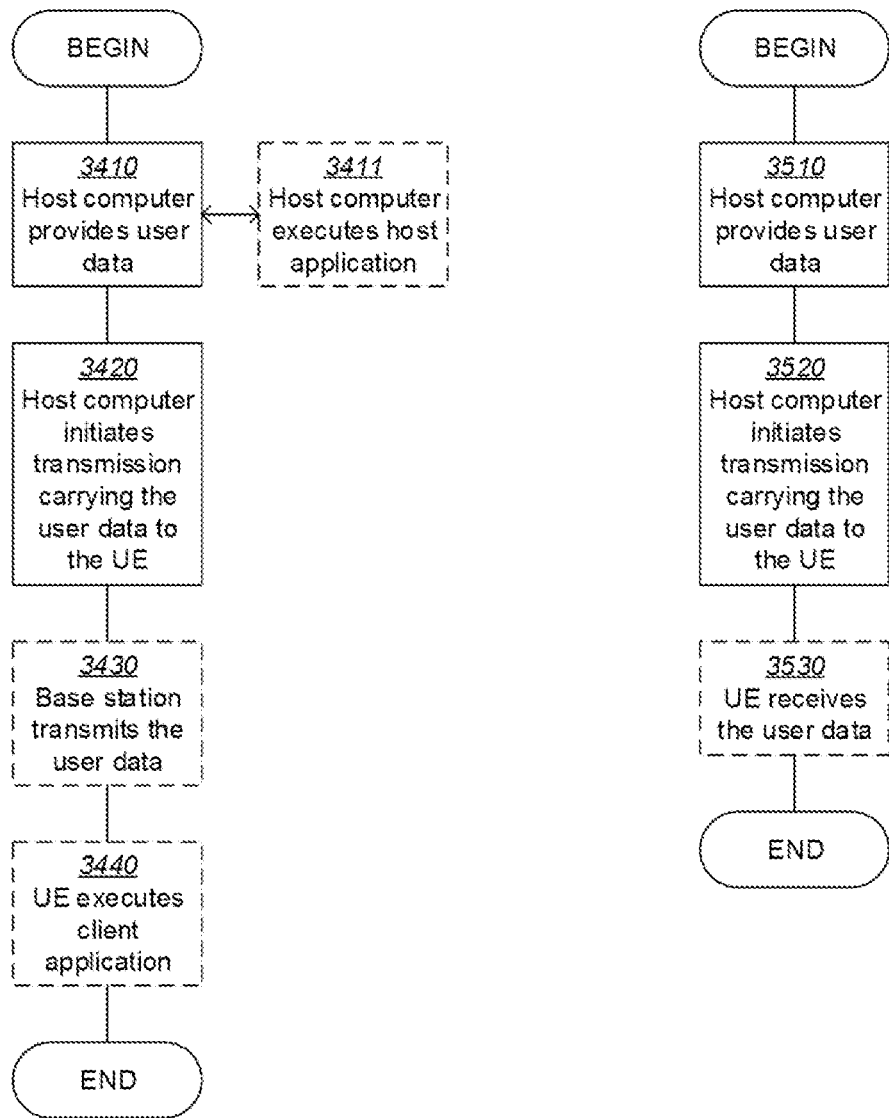

FIRST SERVICE COMMUNICATION PROXY NODE, SECOND COMMUNICATION PROXY NODE AND METHODS IN A WIRELESS COMMUNICATION NETWORK

CROSS REFERENCE TO RELATED APPLICATIONS

This application is a 35 U.S.C. § 371 national stage application of PCT International Application No. PCT/SE2019/050623 filed on Jun. 27, 2019, the disclosure and content of which is incorporated by reference herein in its entirety.

TECHNICAL FIELD

Embodiments herein relate to a first Service Proxy Communication (SCP) node, a second SCP node and methods therein. In particular, they relate to handling control plane traffic of a service related to a User Equipment (UE) in a wireless communication network.

BACKGROUND

In a typical wireless communication network, UE, also known as wireless communication devices, mobile stations, stations (STA) and/or wireless devices, communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the UE within range of the radio network node. The radio network node communicates to the UE in DownLink (DL) and from the UE in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to Radio Network Controllers (RNCs) used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

3GPP has defined a service based architecture for the 5G Core in the 5G system. In 3GPP Release 15, the service framework comprises Network Function (NF) service consumers, NF service producers and an NF Repository Function (NRF). NF service producers exposes services, such as Application Programming Interfaces (APIs) to NF service consumers. The NF service consumers accesses the NF service producer services over the service based interface. An NF may be both an NF service producer and an NF service consumer. NF service consumers finds NF service producers via the NRF, which holds a registry for all services an NF service producer has. NF service producers register themselves into an NRF using the NRF management service. When an NF registers itself, it sends its NF profile to the NRF. When doing so, the NF is an NF service consumer accessing the NRF management service. The NF profile may comprise one or more addresses to the NF service instances. The NF profile may also comprise NF specific information. The NRF services and data structures are further described in 3GPP TS 29.510. When an NF service consumer wants to access an NF service, it may discover the service by using the discovery service in the NRF, by sending a Hypertext Transfer Protocol (HTTP) query. In the response, the NRF may include all NF profiles that match the query. The NF service consumer may use the result to select an NF instance and/or an NF service instance. Examples of NFs are Access and Management Function (AMF), Session Management Function (SMF) and Policy Control Function (PCF). An instance of any of these is an instantiation of the NF in a real deployment. Examples of services provided by an AMF are: Namf_Communication service and Namf_EventExposure service. These services may be instantiated one or more times in an AMF instance. 3GPP TS 23.502 lists all NFs and their service in sub-clauses under clause 5.2.

In 3GPP Release 16 indirect communication is introduced. In indirect communication there is one or more Service Communication Proxys (SCPs) inserted in the path between the NF service consumer and the NF service producer. An SCP is used to route messages between NFs. An NF service consumer may also delegate discovery and selection to SCP.

As described in 3GPP TS 23.501, for indirect communication without delegated discovery and selection: Delegated discovery and selection when used herein means that the SCP performs discovery and selection of an NF service producer on behalf of an NF service consumer. An NF service consumer may perform discovery by querying the NRF. Based on the discovery results, the NF service consumer may perform the selection of an NF instance and of an NF service instance, as in 3GPP Release 15. The NF service consumer may send a service request to the SCP, which request contains the address of the selected service producer pointing to an NF service instance or a set of NF service instances. In the latter case, i.e. if the address of the selected service producer is pointing to a set of NF service instances, the SCP selects an NF service instance. The NF service consumer is unaware of whether a service address is pointing to a set of service instances or an individual service instance. The SCP may interact with the NRF to get selection parameters such as location and/or capacity, if needed. The SCP then routes the service request to the selected NF service producer instance.

As described in 3GPP TS 23.501, for indirect communication with delegated discovery and selection: An NF service consumer does not perform any discovery or selection, i.e. does not perform a discovery service request to the NRF and using the received result for a NF service selection. The NF service consumer adds any necessary discovery and selection parameters required to find a suitable NF service producer to the service request, i.e. in the service request towards the SCP. The SCP uses the service request address and the discovery and selection parameters in the service request message to route the service request to a suitable NF service instance of an NF service producer instance. The SCP may perform discovery with an NRF and obtain a discovery result.

SUMMARY

As a part of developing embodiments herein the inventors identified a problem which first will be discussed.

It is not fully stated, in 3GPP TS 23.501, how the SCPs are inserted in the path between an NF service consumer and an NF service producer, but one possibility is to use similar mechanisms as when a consumer's Security Edge Protection Proxy (cSEPP) is inserted in the path. If using similar mechanisms as when a cSEPP is inserted in the path, the SCP address may be configured in the NF service consumer as the address for the NRF. This means that during a discovery, the SCP may assign a label that represents the address of the actual NF service producer instance. E.g. if the address to an NF service producer instance is servicex-1.nf1.op.org it may be assigned a label, for example label-1. In the response from the NRF, the SCP alters the address to the NF service consumer to label-1.scp.op.org. Thereby the SCP knows that label-1 is to be mapped to servicex-1.nf1.op.org.

Similarly, the SCP may assign labels for notification of Uniform Resource Identifiers (URIs) and for URIs received in an HTTP location parameter pointing to a created resource.

One issue with these approaches is when resources are created, i.e. when a service request is sent from an NF service consumer asking an NF service producer to create a resource. E.g. when an Access and mobility Management Function (AMF) shall establish a Protocol Data Unit (PDU) session, the AMF may then send a Nsmf_PDUSession_CreateSMContext request message to a Session Management Function (SMF), which responds with a URI with the created resource. The same may occur when an AMF creates policy associations for AM and UE policies to a Policy Control Function (PCF). The SCP may alter the URI so that subsequent service requests to these resources will go via the SCP, as described above.

Assuming that an AMF instance, e.g. amf1, is assigned one SCP, e.g. scp1, and another AMF instance, amf2, is assigned another SCP, e.g. scp2. Then if amf1 has associations to PDU sessions and AM and UE policies, the resource addresses for these will point to scp1. However, if the UE context is relocated from amf1 to amf2, the resource addresses will still point to scp1. Relocation may be triggered due to mobility of the UE.

An object of embodiments herein is to improve the communication of data traffic in a wireless communication network.

According to a first aspect of embodiments herein, the object is achieved by a method performed by a first SCP node for assisting a second SCP node in handling control plane traffic of a service related to a UE in a wireless communication network. A UE context is data related to the UE in a first AMF and the UE context comprises a first URI related to a NF service association. The first URI comprises a first string related to the association, which first string represents the URI of an original resource in the NF. The first URI also comprises a first SCP part as part of the first URI authority part related to the address of the first SCP. At a relocation of the control plane traffic of the service from the first AMF passing the first SCP node relating to the control plane traffic of the service, towards a second AMF, the first SCP node changes the first URI to the URI of the original resource in the NF, in the UE context. The first SCP node assists the second SCP node in handling the control plane traffic of the service by sending, to the second SCP node, the UE context comprising the URI of the original resource in the NF. This enables the control plane traffic of the service from the second AMF to pass the second SCP node, for control plane traffic related to the resource in the NF.

According to a second aspect of embodiments herein, the object is achieved by a method performed by a second SCP node for handling control plane traffic of a service related to a UE in a wireless communication network. At a relocation of the control plane traffic of the service from a first AMF passing a first SCP node related to the control plane traffic of the service, towards a second AMF, the second SCP receives, from the first SCP node, a UE context comprising a URI of the original resource in a NF. The second SCP then changes the URI of the original resource in the NF to a second URI, in the UE context, which second URI is related to a NF service association. The second URI comprises a second string related to the association, which second string represents the URI of the original resource, and a second SCP part as part of the second URI authority part, related to the address of the second SCP node. The second SCP node then sends, to the second AMF, the UE context comprising the second URI, enabling the control plane traffic of the service from the second AMF to pass the second SCP for control plane traffic related to the resource in the NF.

According to a third aspect of embodiments herein, the object is achieved by a first SCP node configured to assist a second SCP node in handling control plane traffic of a service related to a UE in a wireless communication network. A UE context is adapted to be data related to the UE in a first AMF and the UE context is adapted to comprise a first URI related to a NF service association. The first URI is adapted to comprise a first string related to the association, which first string is adapted to represent the URI of an original resource in the NF. The first URI is also adapted to comprise a first SCP part as part of the first URI authority part related to the address of the first SCP. The first SCP node is further configured to, at a relocation of the control plane traffic of the service from the first AMF passing the first SCP node relating to the control plane traffic of the service, towards a second AMF, change the first URI to the URI of the original resource in the NF, in the UE context. The first SCP node is further configured to assist the second SCP node in handling the control plane traffic of the service by sending, to the second SCP node, the UE context adapted to comprise the URI of the original resource in the NF, enabling the control plane traffic of the service from the second AMF to pass the second SCP node, for control plane traffic related to the resource in the NF.

According to a fourth aspect of embodiments herein, the object is achieved by a second SCP node configured to handle control plane traffic of a service related to a UE in a wireless communication network. At a relocation of the control plane traffic of the service from a first AMF passing a first SCP node related to the control plane traffic of the service, towards a second AMF, The second SCP node is configured to receive, from the first SCP node, a UE context adapted to comprise a URI of the original NF resource. The second SCP node is further configured to change the URI of the original resource in the NF to a second URI, in the UE context. The second URI is adapted to be related to a NF service association. The second URI is adapted to comprise a second string related to the association, which second string is adapted to represent the URI of the original resource, and a second SCP part as part of the second URI authority part, related to the address of the second SCP node. The second SCP node is further configured to send, to the second AMF, the UE context adapted to comprise the second URI, enabling the control plane traffic of the service from the second AMF to pass the second SCP for control plane traffic related to the resource in the NF.

With the realisation that, in the UE context, the first SCP changes the first URI to the URI of the original resource in the NF, received during the relocation, and that the second SCP then changes the URI of the original resource in the NF to a second URI in the UE context, the control plane traffic of the service from the second AMF is enabled to pass the second SCP. If the first SCP and the second SCP do not make these changes there is a risk that it may lead to non-optimized routing of messages.

BRIEF DESCRIPTION OF THE DRAWINGS

Examples of embodiments herein are described in more detail with reference to attached drawings in which:

FIGS. 10 to 13 are flowcharts illustrating methods implemented in a communication system including a host computer, a base station and a user equipment.

DETAILED DESCRIPTION

Figure 1:
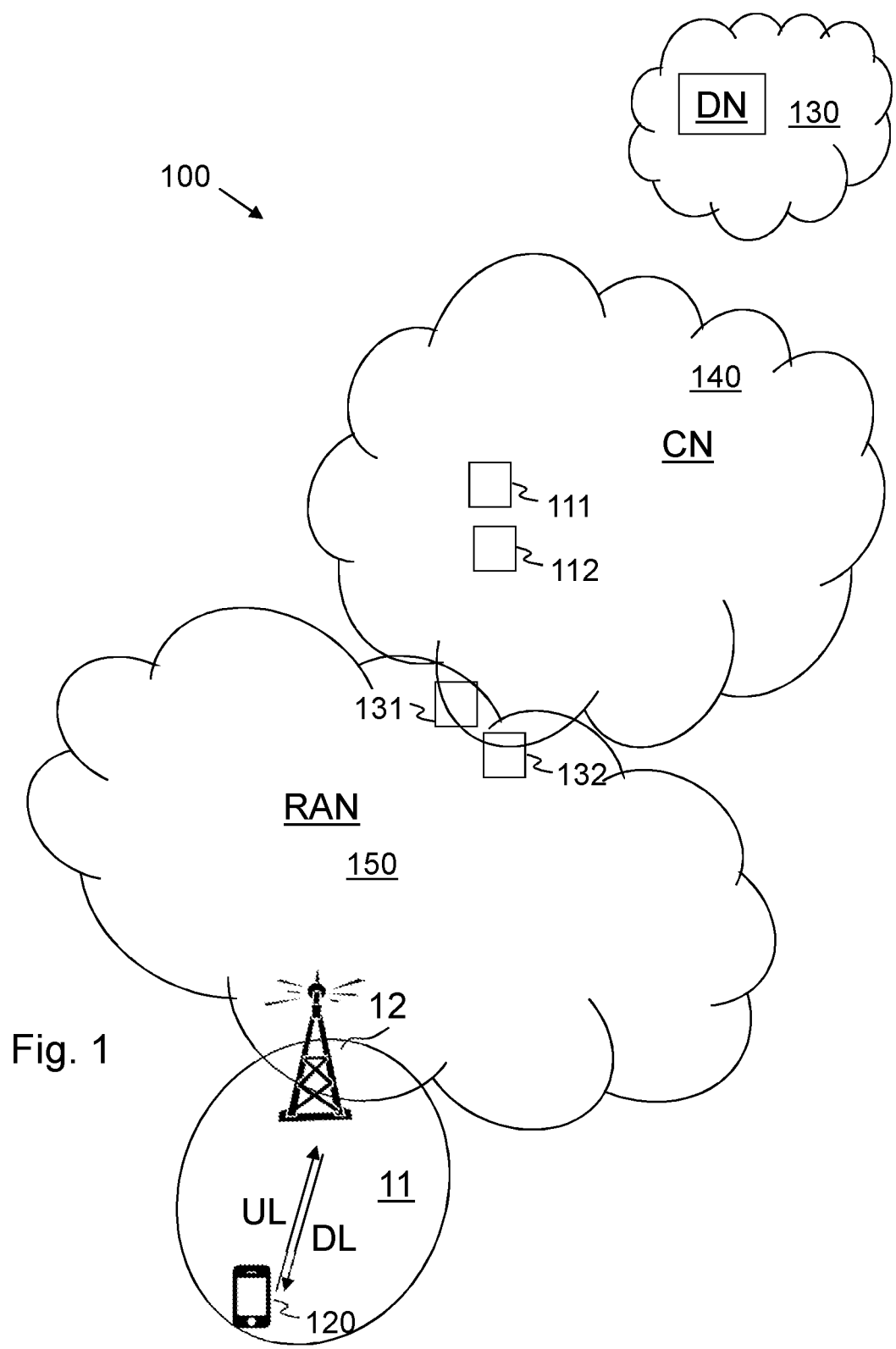
FIG. 1 is a schematic block diagram illustrating embodiments of a communications network.

Embodiments herein relate to communication networks in general. FIG. 1 is a schematic overview depicting a communication network 100. The communication network 100 comprises one or more access network such as RANs and one or more CNs. The communication network 100 may use one or a number of different technologies. Embodiments herein relate to recent technology trends that are of particular interest in a 5G context; however, embodiments are also applicable in further development of existing communication systems such as e.g. LTE and Wideband Code Division Multiple Access (WCDMA).

In the communication network 100, UEs are configured to communicate with the CN or with one another e.g. a UE 120, such as a mobile station, a non-access point station (non-AP STA), a STA, a wireless device and/or a wireless terminal, may be configured for communication. It should be understood by the skilled in the art that "UE" is a non-limiting term which means any terminal, wireless communication terminal, user equipment, narrowband-internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node or a wireless device.

The communication network 100 comprises radio network nodes such as a radio network node 12, providing radio coverage over a geographical area, a service area 11, of a first radio access technology (RAT), such as NR or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node 12 depending e.g. on the first radio access technology and terminology used. The radio network node 12 may be referred to as a serving radio network node wherein the service area may be referred to as a serving cell, and the serving network node communicates with the UE 120 in form of DL transmissions to the UE 120 and UL transmissions from the UE 120. It should be noted that a service area may be denoted as cell, beam, beam group or similar to define an area of radio coverage. The radio network node 12 may beamform its transmissions towards one or more wireless devices such as the UE 120. Beamforming allows the signal to be stronger for an individual connection.

The communication network 100 further comprises one or more network nodes such as a first SCP node 111 and a second SCP node 112. The first SCP node 111 and second SCP node 112 may include the following functionalities:

Indirect communication between NFs.
Delegated discovery and selection.
Message forwarding and routing to destination NF and/or NF service.
Communication security.

More than one SCP may be present in the communication path between NF Services. Furthermore, the communication network comprises a number of other network nodes such as:

A first AMF node 131 and a second AMF node 132 that supports termination of non-access stratum (NAS) signalling, NAS ciphering & integrity protection, registration management, connection management, mobility management, access authentication and authorization, security context management.

A Session Management function (SMF) node (not shown in FIG. 1) which supports: session management (session establishment, modification, release), UE IP address allocation & management, DHCP functions, termination of NAS signalling related to session management, DL data notification, traffic steering configuration for UPF for proper traffic routing.

A User plane function (UPF) node (not shown in FIG. 1) which supports: packet routing & forwarding, packet inspection, Quality of Service (QoS) handling, acts as external Protocol Data Unit (PDU) session point of interconnect to Data Network (DN), and is an anchor point for intra- & inter-RAT mobility.

Other possible nodes or functions may be a Policy Control Function (PCF) node which supports: unified policy framework, providing policy rules to Control Plane (CP) functions, access subscription information for policy decisions in Unified Data Repository (UDR). Authentication Server Function (AUSF) node which acts as an authentication server. Unified Data Management (UDM) node which supports: generation of Authentication and Key Agreement (AKA) credentials, user identification handling, access authorization, subscription management. Application Function (AF) node which supports: application influence on traffic routing, accessing Network Exposure Function (NEF), interaction with policy framework for policy control. NEF node which supports: exposure of capabilities and events, secure provision of information from external application to 3GPP network, translation of internal and/or external information. NF Repository Function (NRF) node which supports: service discovery function, maintains NF profile and available NF instances.

The communication network 100 comprises one or more CNs 140 and one or more RANs 150. The UE 120 is connected via one or more RANs 150, to the one or more CNs 140. The methods according to embodiments herein are performed by the first SCP node 111 and the second SCP node 112. As an alternative, a Distributed Node (DN) and functionality, e.g. comprised in a cloud 130 as shown in FIG. 1, may be used for performing or partly performing the method.

Figure 2:
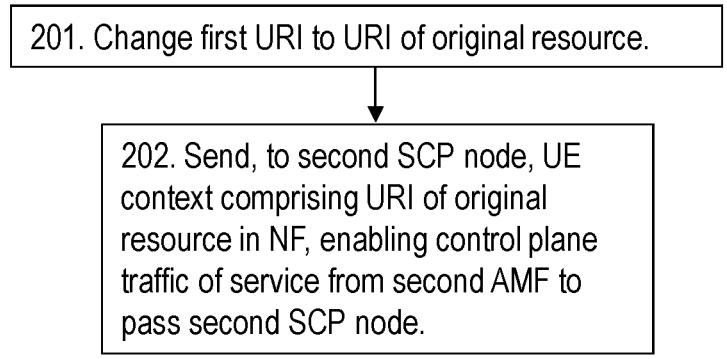
FIG. 2 is a flowchart depicting embodiments of a method in a first SCP node.

Example embodiments of a method performed by the first SCP node 111 for assisting the second SCP node 112 in handling control plane traffic of a service related to the UE 120 in a wireless communication network 100 will now be described with reference to a flowchart depicted in FIG. 2. A UE context is data related to the UE 120 in the first AMF 131. The UE context comprises a first URI related to an NF service association. The first URI comprises: A first string related to the association, which first string represents the URI of an original resource in the NF, and a first SCP part as part of the first URI authority part related to the address of the first SCP node 111.

The method comprises the following actions, which actions may be taken in any suitable order.

Action 201

E.g. during handover of the UE 120, AMF relocation from a first AMF 131 to a second AMF 132 is performed, wherein the control plane traffic within the 5GC related to the UE 120 is passing the first SCP node 111 before the handover. To enable the control plane traffic of a service from the second AMF 132 to pass the second SCP node 112, the first SCP node 111 needs to rewrite, i.e. change, the first URI so that it points to the URI of the original resource and thereby having the real URI of the resource in the NF. Therefore at a relocation of the control plane traffic of the service from the first AMF 131 passing the first SCP node 111 relating to the control plane traffic of the service, towards the second AMF 132, the first SCP node 111 changes the first URI to the URI of the original resource in the NF, in the UE context.

Action 202

As the first SCP node 111 has changed the first URI to the URI of the original resource, the first SCP node 111 thus assists the second SCP node 112 in handling the control plane traffic of the service by sending, to the second SCP node 112, the UE context comprising the URI of the original resource in the NF. This enables the control plane traffic of the service from the second AMF 132 to pass the second SCP node 112, for control plane traffic related to the resource in the NF.

Figure 3:
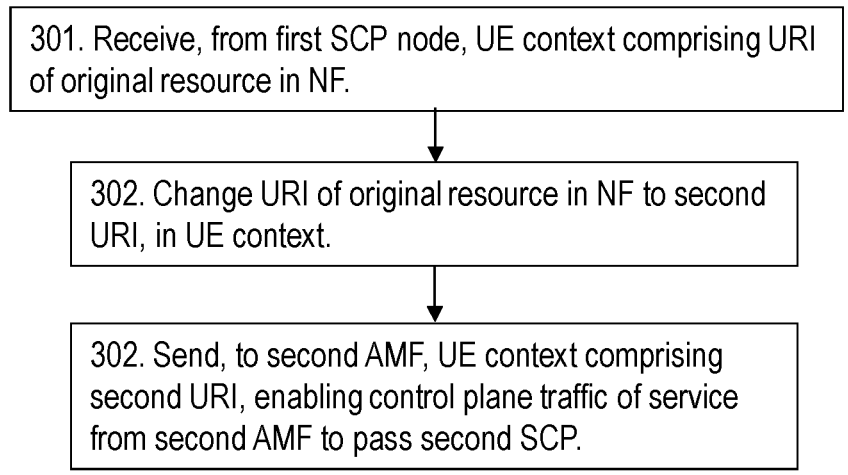
FIG. 3 is a flowchart depicting embodiments of a method in a second SCP node.

Example embodiments of a method performed by the second SCP node 112 for handling control plane traffic of a service related to a UE 120 in a wireless communication network 100 will now be described with reference to a flowchart depicted in FIG. 3.

The method comprises the following actions, which actions may be taken in any suitable order.

Action 301

E.g. during handover of the UE 120, the relocation of the control plane traffic of the service from the first AMF 131 passing the first SCP node 111 related to the control plane traffic of the service, towards the second AMF 132, the second SCP node 112 receives, from the first SCP node 111, the UE context comprising the URI of the original resource in the NF.

Action 302

In order to enable the control plane traffic of the service from the second AMF 132 to pass the second SCP 112, the second SCP node 112 changes the URI of the original resource in the NF to a second URI, in the UE context, which second URI is related to a Network Function, NF, service association. The second URI comprises a second string related to the association, which second string represents the URI of the original resource, and a second SCP part as part of the second URI authority part, related to the address of the second SCP node 112. It is advantageous that the control plane traffic of a service related to the UE 120 is routed via the second SCP node 112 to the second AMF 132 because the network may have been designed in a way that the second SCP node 112 shall assist the second AMF node 132. For example, the first SCP node 111 and the first AMF 131 may be located in a different data centre compared to the second SCP node 112 and second AMF 132. Furthermore, metrics may be provided by the SCPs related to signalling traffic of the AMF 131 and AMF 132, whereby the SCP node 111 provides metrics for the AMF 131.

Action 303

The second SCP node 112 sends, to the second AMF 132, the UE context comprising the second URI. This enables control plane traffic of the service from the second AMF 132 to pass the second SCP 112 for control plane traffic related to the resource in the NF. A positive response may then be returned from the second AMF 132 to the first AMF 131, via the second SCP node 112 and the first SCP node 111.

The preparation phase for the handover may now be completed and the execution phase of the handover may then be started.

Embodiments herein such as mentioned above will now be further described and exemplified. The text below is applicable to and may be combined with any suitable embodiment described above.

As described above, at an AMF relocation, i.e. at a relocation of the control plane traffic of the service from the first AMF 131 passing the first SCP node 111, towards the second AMF 132, the first SCP 111 changes the URIs in a UE context, e.g. for SMF and PCF associations, in the UE context. I.e. the first SCP 111 changes the first URI to the URI of the original resource in the NF in the UE context. SMF and PCF associations when used herein may e.g. be associations related to session management for PDU sessions, access and mobility policy control, and UE policy control.

The SCP nodes 111 and 112 use a labelling mechanism. A labelling mechanism when used herein is when a label in a first HTTP authority represents a second HTTP authority. The first HTTP authority may be an FQDN=<label>.<fqdn> and the second HTTP authority may be an FQDN or IP address. Assuming there are two PDU sessions, with respective addresses ps-1.smf1.op.org and ps-2.smf1.op.org, and two policy associations with respective addresses ue-1.pcf1.op.org and am-1.pcf1.op.org. By using a labelling mechanism the first SCP 111 may have the following table:

label-1=ps-1.smf1.op.org
label-2=ps-2.smf1.op.org
label-3=ue-1.pcf1.op.org
label-4=am-1.pcf1.op.org.

The first AMF 131 will then store the following addresses, i.e. HTTP authorities, in the URIs, in the UE context:

1st PDU session: lable-1.scp1.op.org
2nd PDU session: label-2.scp1.op.org
UE policy association: label-3.scp1.op.org
Access and Mobility (AM) policy association: label-4.scp1.op.org.

To enable the control plane traffic of the service from the second AMF 132 to pass the second SCP 112 for control plane traffic related to the resource in the NF, according to embodiments herein, the first SCP node 111 changes, i.e. rewrites, the addresses in the UE context. The addresses are changed from the first URI related to first SCP node 111 to the URI of the original resource in the NF. The second SCP node 112 receives the UE context with the changed addresses. The second SCP node 112 then changes the addresses in the UE context, i.e. rewrites, the addresses with its own label assignment. I.e. the second SCP node 112 changes the URI of the original resource in the NF to be a second URI related to the second SCP node 112. In the following example a series started from label 9, however, the labelling is SCP internal, so any label format of numbering may be used.

Then for the first PDU session:
The first SCP node 111:
The HTTP authority of first PDU session being label-1.scp1.op.org is rewritten to ps-1.smf1.op.org. I.e. the first SCP node 111 has changed the first URI to the URI of the original resource in the NF.
The second SCP node 112:
The HTTP authority of first PDU session being ps-1.smf1.op.org is rewritten to label-9.scp2.op.org.

I.e. the second SCP node 112 has changed the URI of the original resource in the NF to a second URI.

Using the same procedure for all associations the second AMF 132 may get the following addresses, i.e. HTTP authorities, in the URIs in the UE context:

First PDU session: label-9.scp2.op.org.
Second PDU session: label-10.scp2.op.org.
UE policy association: label-11.scp2.op.org.
AM policy association: label-12.scp2.op.org.

Figure 4:
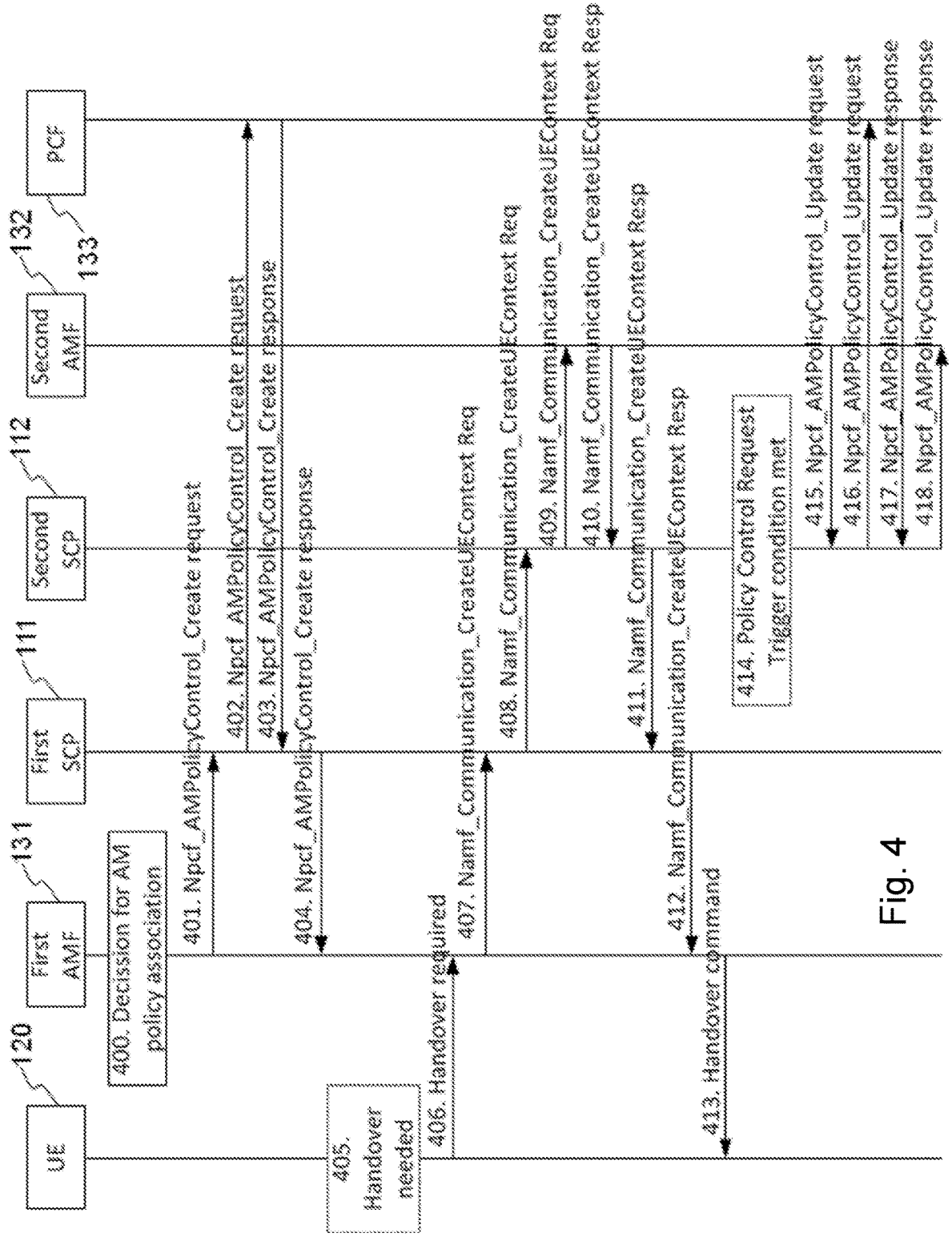
FIG. 4 is a combined signalling scheme and flowchart according to some embodiments herein.
Figure 5:
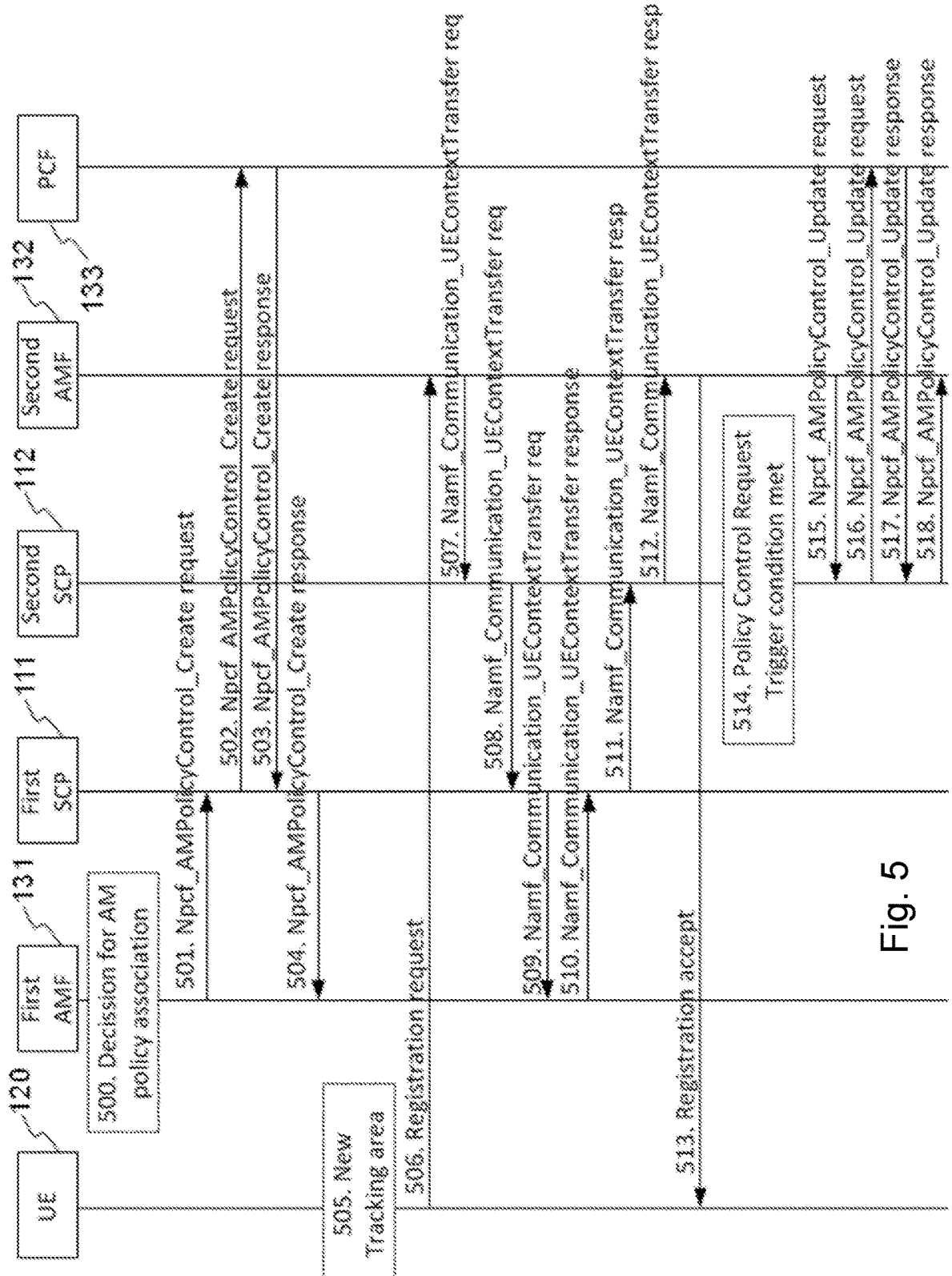
FIG. 5 is another combined signalling scheme and flowchart according to some embodiments herein.

Embodiments herein such as mentioned above will now be further described and exemplified with reference to combined flowcharts and signalling schemes depicted in FIGS. 4 and 5. The example of associations used in FIGS. 4 and 5 are Access and Mobility (AM) policy associations. An AM policy association when used herein may e.g. be for an AMF to contact a PCF when an Access and mobility event has occurred. However there are more associations that the first AMF 131 and second AMF 132 may have, e.g. one association per PDU session towards the SMF(s) and UE policy associations towards a PCF. All these associations are stored in the UE context in the first AMF 131, e.g. AMF1, and second AMF 132, e.g. AMF2. A UE context when used herein may be referred to as state data per UE 120. The associations are stored as resource URIs, e.g. first URI and second URI, which gives a unique "address" and/or "pointer" for each association. The flows are simplifications of flows in 3GPP TS 23.502 in clauses 4.2.2.2.2, 4.9.1.3.2-3, 4.16.1 and 4.16.2. and adapted to embodiments herein.

The generic form of the resource URI is specified in 3GPP TS 29.501 clause 4.4.1

For the example below where a PCF service is used and it is assumed that HTTPS is used for the resource URI, it may have the following structure:

https://{authority}{$string}/{apiName}/v1/{apiSpecificResourceUriPart}.

The $string may be an empty string or a string starting with "/".

The first AMF 131, referred to as AMF1 in this example, routes messages to the first SCP node 111, referred to as SCP1 in this example, because the authority part contains the address of the first SCP node 111. For simplicity the first SCP node 111 has a Fully Qualified Domain Name (FQDN) of scp1.op.org. In real deployments the FQDN of the first SCP node 111 may be more complex and contain operator specific details such as Mobile Network Codes (MNCs) and Mobile Country Codes (MCCs). This may also be the case for all other FQDNs.

The following FQDNs are used:
SCP2=scp2.op.org
AMF1=amf1.op.org
AMF2=amf2.op.org
PCF=pcf.op.org FIG. 4 is a combined flowchart and signalling scheme according to an example of embodiments herein. In FIG. 4 actions according to an example of relocation of the control plane traffic of the service from the first AMF 131 passing the first SCP node 111 related to the control plane traffic of the service, towards the second AMF 132, is shown. The actions do not have to be taken in the order stated below, but may be taken in any suitable order.

Action 400

The AMF 131 decides that an AM policy association is needed. The AMF 131 has discovered the PCF 133 and received the address to the PCF 133 from an NRF. The first SCP node 111 has modified the PCF 133 URI so that the first AMF 131 sends the Npcf_AMPolicyControl_create request to the first SCP node 111. This is to allocate the SCP node 111 for AMF 131 and consequently to support indirect communication.

Action 401

The first SCP node 111 then forwards the Npcf_AM_PolicyControl_create request to the PCF 133.

Action 402

The PCF 133 creates a resource for the AM policy association and gives the following URI, i.e. the URI of the original resource in the NF, in the location parameter of an HTTPS message that is returned as a response:

Location=https://pcf.op.org/npcf-am-policy-control/v1/policies/am-policyassociation1, where "pcf.op.org" and "am-policyassociation1" are examples.

Action 403

The first SCP 111 receives the response from the PCF 133 and needs to handle the location parameter in the HTTP message. There are two possible alternatives to do this, which are described below:

Alternative 1: location=https://scp1.op.org/pcf.op.org/npcf-am-policy-control/v1/policies/am-policyassociation1.

Alternative 2: location=https://pcf-op-org.scp1.op.org/npcf-am-policy-control/v1/policies/am-policyassociation1.

A further example to do this is that the authority part may have label1.scp1.op.org, and the first SCP node 111 remembers that label1 means pcf.op.org.

Action 404

The first AMF 131 receives the response from the first SCP node 111. The response comprises the HTTP location parameter, which was modified in Action 403, for the created resource. The URI in the location parameter is stored in the UE context, which is data related to the UE 120. The UE context comprises, among other things, a first URI, related to a NF, e.g. PCF 133, service association. The first URI comprises a first string related to the association, which first string represents the URI of an original resource in the NF, and a first SCP part as part of the first URI authority part related to the address of the first SCP node 111.

The UE 120 then goes into connected state and has ongoing data traffic.

Action 405

The UE 120, in case of WiFi, or a serving network node to the UE 120, such as the network node 12 in the RAN, in case of cellular access, decides that a handover is needed.

Action 406

The serving network node to the UE 120, e.g. network node 12, then sends a handover required message to the first AMF 131.

Action 407

The first AMF 131 decides, e.g. based on a target network node, that a relocation of the first AMF 131 is needed. This means that that control plane traffic of the service from the first AMF 131 passing the first SCP node 111 relating to the control plane traffic of the service, needs to be moved towards the second AMF 132. The first AMF 131 therefore sends a Namf_Communication_CreateUEContext request message towards the second AMF 132. A message is sent to the first SCP node 111 and includes the UE context. The UE context comprises among other things resource URIs for all associations that the first AMF 131 has, i.e. the UE context comprises a first URI related to a NF service association. The first URI comprises a first string related to the association, which first string represents the URI of an original resource in the NF, and a first SCP part as part of the first URI authority part related to the address of the first SCP node 111. For the AM policy association, the first URI is the same as in alternative 1 or alternative 2 in Action 403.

Action 408

The first SCP node 111 then identifies the resource URIs, i.e. the first URI, and changes it to the URI of an original resource. For the AM policies the first URI will change to the following:

Alternative 1: AM policy URI=https://npcf-am-policy-control/v1/policies/am-policyassociation1.

Alternative 2: AM policy URI=https://npcf-am-policy-control/v1/policies/am-policyassociation1.

The first SCP node 111 knows that the second SCP node 112 is serving the second AMF 132 and forwards the request message to the second SCP node 132. The first SCP node knows that the second SCP node 112 is serving the second AMF 132 e.g. per network configuration.

Action 409

The second SCP node 112 identifies the URIs of the original resource in the NF and changes them to new resource URIs, i.e. to a second URI, so that the request related to the associations will be routed via the second SCP node 112 to the second AMF 132. The second URI is related to a NF service association. The second URI comprises a second string related to the association, which second string represents the URI of the original resource, and a second SCP part as part of the second URI authority part, related to the address of the second SCP node 112.

For AM policies the second URI will change to the following:

Alternative 1: location=https://scp2.op.org/pcf.op.org/npcf-am-policy-control/v1/policies/am-policyassociation1.

Alternative 2: location=https://pcf-op-org.scp2.op.org/npcf-am-policy-control/v1/policies/am-policyassociation1.

Action 410

A positive response, e.g. empty HTTP OK, is returned from the second AMF 132 to the second SCP node 112.

Action 411

The received positive response is forwarded from the second SCP node 112 to the first SCP node 111.

Action 412

The received positive response is returned from the first SCP node 111 to the first AMF 131.

Action 413

The preparation phase for the handover is now complete. The execution phase of the handover is then started by sending a handover command from the first AMF 131 to the UE 120 via a serving network node to the UE 120 e.g. network node 12.

The handover execution continues (not shown).

Action 414

A trigger is met, at the second SCP node 112 for AM policies. This means that the second AMF 132 should report to the PCF 133 that the trigger was met.

Action 415

The second AMF 132 sends a Npcf_AMPolicyControl_Update request to the second SCP node 112. The URI is:

Alternative 1: AM Policy URI=https://scp2.op.org/pcf.op.org/npcf-am-policy-control/v1/policies/am-policyassociation1/update.

Alternative 2: AM policy URI=https://pcf-op-org.scp2.op.org/npcf-am-policy-control/v1/policies/am-policyassociation1/update.

Since the URI authority part in the second URI has the address of the second SCP node 112, the second AMF 132 routes the message to the second SCP node 112.

Action 416

The second SCP node 112 modifies the second URI and sends it, to the target identified by the modified second URI, e.g. to the PCF 133. The second URI is:

Alternative 1: AM Policy URI=https://pcf.op.org/npcf-am-policy-control/v1/policies/am-policyassociation1.

Alternative 2: AM Policy URI=https://pcf.op.org/npcf-am-policy-control/v1/policies/am-policyassociation1.

Action 417

A positive Npcf_AMPolicyControl_Update response, such as empty HTTP OK, is returned from the PCF 133 to the second SCP 112.

Action 418

The positive Npcf_AMPolicyControl_Update response is forwarded from the second SCP node 112 to the second AMF 132.

FIG. 5 is a combined flowchart and signalling scheme according to embodiments herein. In FIG. 5 actions according to an example of idle mobility where the UE 120 has its UE context in the first AMF 131, is shown. The steps do not have to be taken in the order stated below, but may be taken in any suitable order.

Actions 500-504 are the same as Actions 400-404 in FIG. 1.

Action 500

The AMF 131 may decide that an AM policy association is needed. The AMF 131 has discovered the PCF 133 and received the address to the PCF 133 from a NRF. The first SCP node 111 has modified the PCF address so that the first AMF 131 sends the Npcf_AMPolicyControl_create request to the first SCP node 111.

Action 501

The first SCP node 111 forwards the Npcf_AMPolicyControl_create request to the PCF 133.

Action 502

The PCF 133 creates a resource for the AM policy association and gives the following URI, i.e. the URI of the original resource in the NF, in the location parameter of a HTTP message that is returned as a response:

Location=https://pcf.op.org/npcf-am-policy-control/v1/policies/am-policyassociation1, where "pcf.op.org" and "am-policyassociation1" are examples.

Action 503

The first SCP 111 receives the response from the PCF 133 and needs to handle the location parameter in the HTTP message. There are two possible alternatives to do this, which are described below:

Alternative 1: location=https://scp1.op.org/pcf.op.org/npcf-am-policy-control/v1/policies/am-policyassociation1.

Alternative 2: location=https://pcf-op-org.scp1.op.org/npcf-am-policy-control/v1/policies/am-policyassociation1.

A further example to do this may be that the authority part could have label1.scp1.op.org, and the first SCP node 111 remembers that label1 means pcf.op.org.

Action 504

The first AMF 131 receives the response from the first SCP node 111. The response comprises the HTTP location parameter, which was modified in Action 503, for the created resource. The URI in the location parameter is stored in the UE context, which is data related to the UE 120. The UE context comprises, among other things, a first URI, related to a NF, e.g. PCF 133, service association. The first URI comprises a first string related to the association, which first string represents the URI of an original resource in the NF, and a first SCP part as part of the first URI authority part related to the address of the first SCP node 111.

Action 505

The UE 120 is in a new tracking area and needs to do a registration to update the new tracking area.

Action 506

The UE 120 sends a registration request to the second AMF 132. A RAN may decide that the second AMF 132 is to be used and therefore forwards the message to the second AMF 132.

Action 507

The second AMF 132 has no UE context, but sees that the UE 120 was in the first AMF 131 before. The second AMF 132 sees that the UE 120 was in the first AMF 131 before based on a temporary ID received from the UE 120. The second AMF 132 thus sends to the second SCP node 112 a Namf_Communication_UEContextTransfer req to get the UE context from the first AMF 131.

Action 508

The second SCP node 112 sees that the first SCP node 111 is serving the first AMF 131 and forwards the Namf_Communication_UEContextTransfer req message to the first SCP node 111. The second SCP node 112 sees that the first SCP node 111 is serving the first AMF 131, e.g. per network configuration.

Action 509

The first SCP node 111 then forwards the message Namf_Communication_UEContextTransfer req, to the first AMF 131.

Action 510

The first AMF 131 responds to the first SCP node 111 and includes the UE context in the response. The UE context contains among other things resource URIs for all associations that the first AMF 131 has, i.e. the UE context comprises a first URI related to a NF service association. The first URI comprises a first string related to the association, which first string represents the URI of an original resource in the NF, and a first SCP part as part of the first URI authority part related to the address of the first SCP node 111. For the AM policy association, the URI is as in Action 503 alternative 1 or alternative 2.

Action 511

The first SCP node 111 identifies the first URI in the UE context provided HTTP body of the message and changes the first URI to the URI of an original resource in the NF. For AM policies the first URI will change to the following:

Alternative 1: AM policy URI=https://npcf-am-policy-control/v1/policies/am-policyassociation1.

Alternative 2: AM policy URI=https://npcf-am-policy-control/v1/policies/am-policyassociation1.

The first SCP 111 then forwards the message to the second SCP 112.

Action 512

The second SCP 112 identifies the first URI in the UE context provided in the HTTP body of the message and changes it to a second URI so that requests related to the associations will be routed via the second SCP 112 from the second AMF 132. The second URI is related to a NF service association. The second URI comprises a second string related to the association, which second string represents the URI of the original resource, and a second SCP part as part of the second URI authority part, related to the address of the second SCP node 112. For AM policies the second URI will change to the following:

Alternative 1: AM policy URI=https://scp2.op.org/pcf.op.org/npcf-am-policy-control/v1/policies/am-policyassociation1.

Alternative 2: AM policy URI=https://pcf-op-org.scp2.op.org/npcf-am-policy-control/v1/policies/am-policyassociation1.

When the second AMF 132 receives the UE context, it stores it.

Action 513

The second AMF 132 accepts the registration of the UE 120 to update the new tracking area.

Actions 514-518 are the same as Actions 414-418 in FIG. 4.

Action 514

A trigger is met, at the second SCP node 112 for AM policies. This means that the second AMF 132 should report to PCF that the trigger was met.

Action 515

The second AMF 132 sends a Npcf_AMPolicyControl_Update request to the second SCP node 112. The URI is:

Alternative 1: AM Policy URI=https://scp2.op.org/pcf.op.org/npcf-am-policy-control/v1/policies/am-policyassociation1/update.

Alternative 2: AM policy URI=https://pcf-op-org.scp2.op.org/npcf-am-policy-control/v1/policies/am-policyassociation1/update.

Since the URI authority part in the second URI has the address of the second SCP node 112, the second AMF 132 routes the message to the second SCP node 112.

Action 516

The second SCP node 112 modifies the second URI and sends it, to the target identified by the modified second URI, e.g. to the PCF 133. The second URI is:

Alternative 1: AM Policy URI=https://pcf.op.org/npcf-am-policy-control/v1/policies/am-policyassociation1.

Alternative 2: AM Policy URI=https://pcf.op.org/npcf-am-policy-control/v1/policies/am-policyassociation1.

Action 517

A positive Npcf_AMPolicyControl_Update response, such as empty HTTP OK, is returned from the PCF 133 to the second SCP 112.

Action 518

The positive Npcf_AMPolicyControl_Update response is forwarded from the second SCP node 112 to the second AMF 132.

Figure 6A:
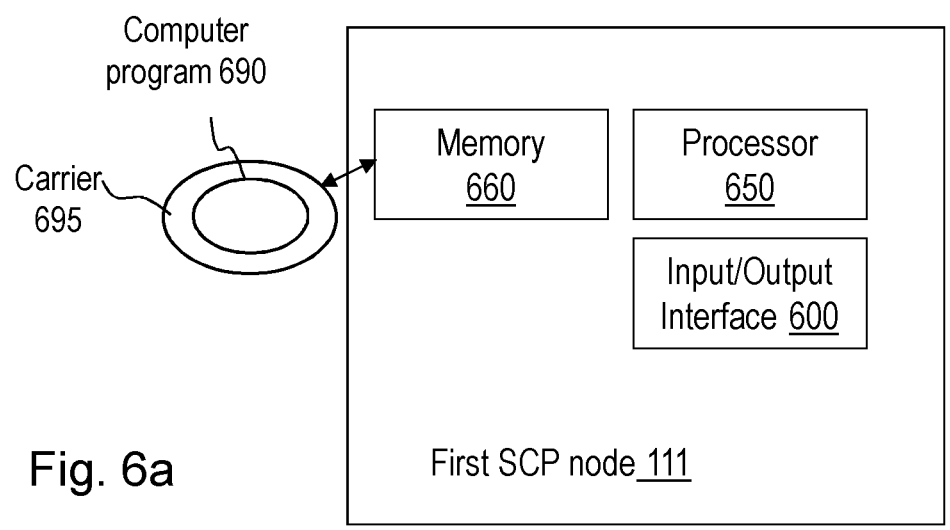
FIGS. 6 *a* and *b* are schematic block diagrams illustrating embodiments of a first SCP node.
Figure 6B:
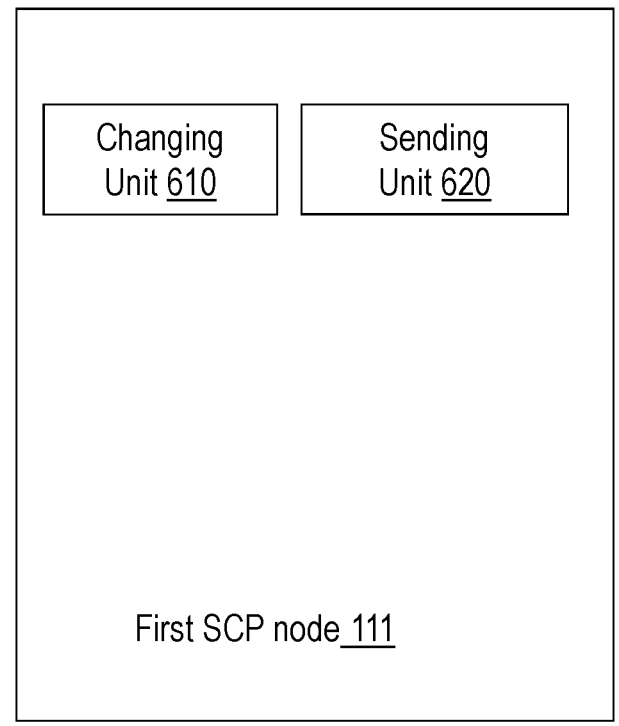

To perform the method actions above for assisting the second SCP node 112 in handling control plane traffic of a service related to the UE 120 in the wireless communication network 100, the first SCP node 111 may comprise the arrangement depicted in FIGS. 6a and 6b. A UE context is adapted to be data related to the UE 120 in a first AMF 131, which UE context is adapted to comprises a first URI related to a NF service association. The first URI is adapted to comprise a first string related to the association, which first string is adapted to represent the URI of an original resource in the NF, and a first SCP part as part of the first URI authority part related to the address of the first SCP node 111.

The first SCP node 111 may comprise an input and output interface 600 configured to communicate e.g. with the second SCP node 112. The input and output interface 600 may comprise a wireless receiver (not shown) and a wireless transmitter (not shown).

The first SCP node 111 is configured to, e.g. by means of a changing unit 610 in the first SCP node 111, at a relocation of the control plane traffic of the service from the first AMF 131 passing the first SCP node 111 relating to the control plane traffic of the service, towards a second AMF 132, change the first URI to the URI of the original resource in the NF, in the UE context.

The first SCP node 111 is configured to, e.g. by means of a sending unit 620 in the first SCP node 111, assist the second SCP node 112 in handling the control plane traffic of the service by sending, to the second SCP node 112, the UE context adapted to comprise the URI of the original resource in the NF, enabling the control plane traffic of the service from the second AMF 132 to pass the second SCP node 112, for control plane traffic related to the resource in the NF.

The embodiments herein may be implemented through a respective processor or one or more processors, such as a processor 650 of a processing circuitry in the first SCP node 111 depicted in FIG. 6a, together with a respective computer program code for performing the functions and actions of the embodiments herein. The program code mentioned above may also be provided as a computer program product, for instance in the form of a data carrier carrying computer program code for performing the embodiments herein when being loaded into the first SCP node 111. One such carrier may be in the form of a CD ROM disc. It is however feasible with other data carriers such as a memory stick. The computer program code may furthermore be provided as pure program code on a server and downloaded to the first SCP node 111.

The first SCP node 111 may further comprise a memory 660 comprising one or more memory units to store data on. The memory comprises instructions executable by the processor 650. The memory 660 is arranged to be used to store e.g. application data, UE context, data packets, events, data, configurations and applications to perform the methods herein when being executed in the first SCP node 111.

Those skilled in the art will also appreciate that the units in the first SCP node 111 mentioned above may refer to a combination of analog and digital circuits, and/or one or more processors configured with software and/or firmware, e.g. stored in the first SCP node 111 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 690 comprises instructions, which when executed by the respective at least one processor 650, cause the at least one processor 650 of the first SCP node 111 to perform the actions above.

In some embodiments, a carrier 695 comprises the computer program 690, wherein the carrier 695 is one of an electronic signal, an optical signal, an electromagnetic signal, a magnetic signal, an electric signal, a radio signal, a microwave signal, or a computer-readable storage medium.

Figure 7A:
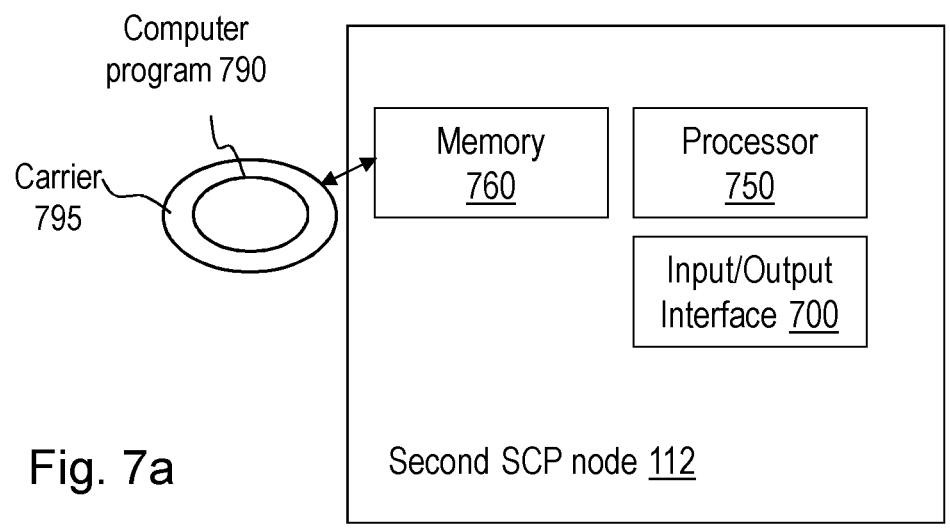
FIGS. 7 *a* and *b* are schematic block diagrams illustrating embodiments of a second SCP node.
Figure 7B:
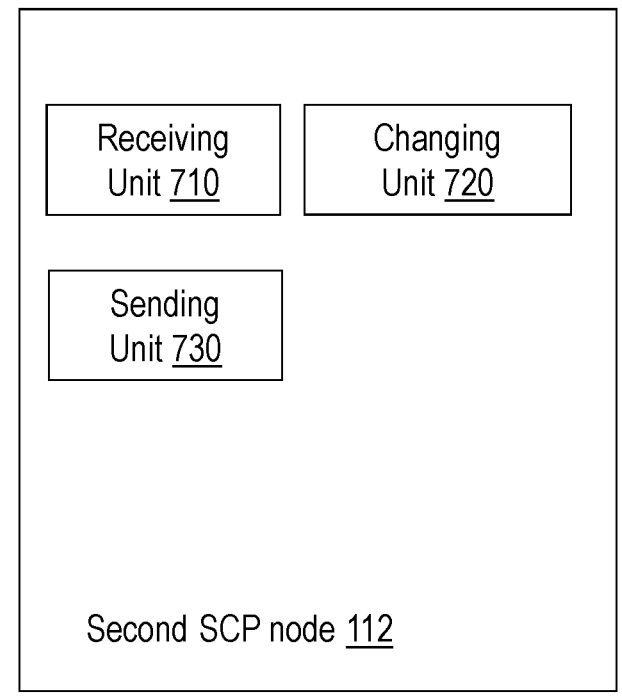

To perform the method actions above for handling control plane traffic of a service related to the UE 120 in the wireless communication network 100, the second SCP node 112 may comprise the arrangement depicted in FIGS. 7a and 7b.

The second SCP node 112 may comprise an input and output interface 700 configured to communicate e.g. with the first SCP node 112. The input and output interface 700 may comprise a wireless receiver (not shown) and a wireless transmitter (not shown).

The second SCP node 112 is configured to, e.g. by means of a receiving unit 710 in the serving node 132, receive, from the first SCP node 111, a UE context adapted to comprise a URI of the original resource in a NF.

The second SCP node 112 is configured to, e.g. by means of an changing unit 720 in the second SCP node 112, change the URI of the original resource in the NF to a second URI, in the UE context, which second URI is adapted to be related to a Network Function, NF, service association, which second URI is adapted to comprise:

a second string related to the association, which second string is adapted to represent the URI of the original resource, and a second SCP part as part of the second URI authority part, related to the address of the second SCP node 112.

The serving node 132 is configured to, e.g. by means of a sending unit 730 in the second SCP node 112, send, to the second AMF 132, the UE context adapted to comprise the second URI, enabling the control plane traffic of the service from the second AMF 132 to pass the second SCP 112 for control plane traffic related to the resource in the NF.

The embodiments herein may be implemented through a respective processor or one or more processors, such as a processor 750 of a processing circuitry in the second SCP node 112 depicted in FIG. 7*a*, together with a respective computer program code for performing the functions and actions of the embodiments herein. The program code mentioned above may also be provided as a computer program product, for instance in the form of a data carrier carrying computer program code for performing the embodiments herein when being loaded into the second SCP node 112. One such carrier may be in the form of a CD ROM disc. It is however feasible with other data carriers such as a memory stick. The computer program code may furthermore be provided as pure program code on a server and downloaded to the second SCP node 112.

The second SCP node 112 may further comprise a memory 760 comprising one or more memory units to store data on. The memory comprises instructions executable by the processor 750. The memory 760 is arranged to be used to store e.g. application data, UE context, data packets, events, data, configurations and applications to perform the methods herein when being executed in the second SCP node 112.

Those skilled in the art will also appreciate that the units in the second SCP node 112 mentioned above may refer to a combination of analog and digital circuits, and/or one or more processors configured with software and/or firmware, e.g. stored in the second SCP node 112 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 790 comprises instructions, which when executed by the respective at least one processor 750, cause the at least one processor 750 of the second SCP node 112 to perform the actions above.

In some embodiments, a carrier 795 comprises the computer program 790, wherein the carrier 795 is one of an electronic signal, an optical signal, an electromagnetic signal, a magnetic signal, an electric signal, a radio signal, a microwave signal, or a computer-readable storage medium.

Further Extensions and Variations

Figure 8:
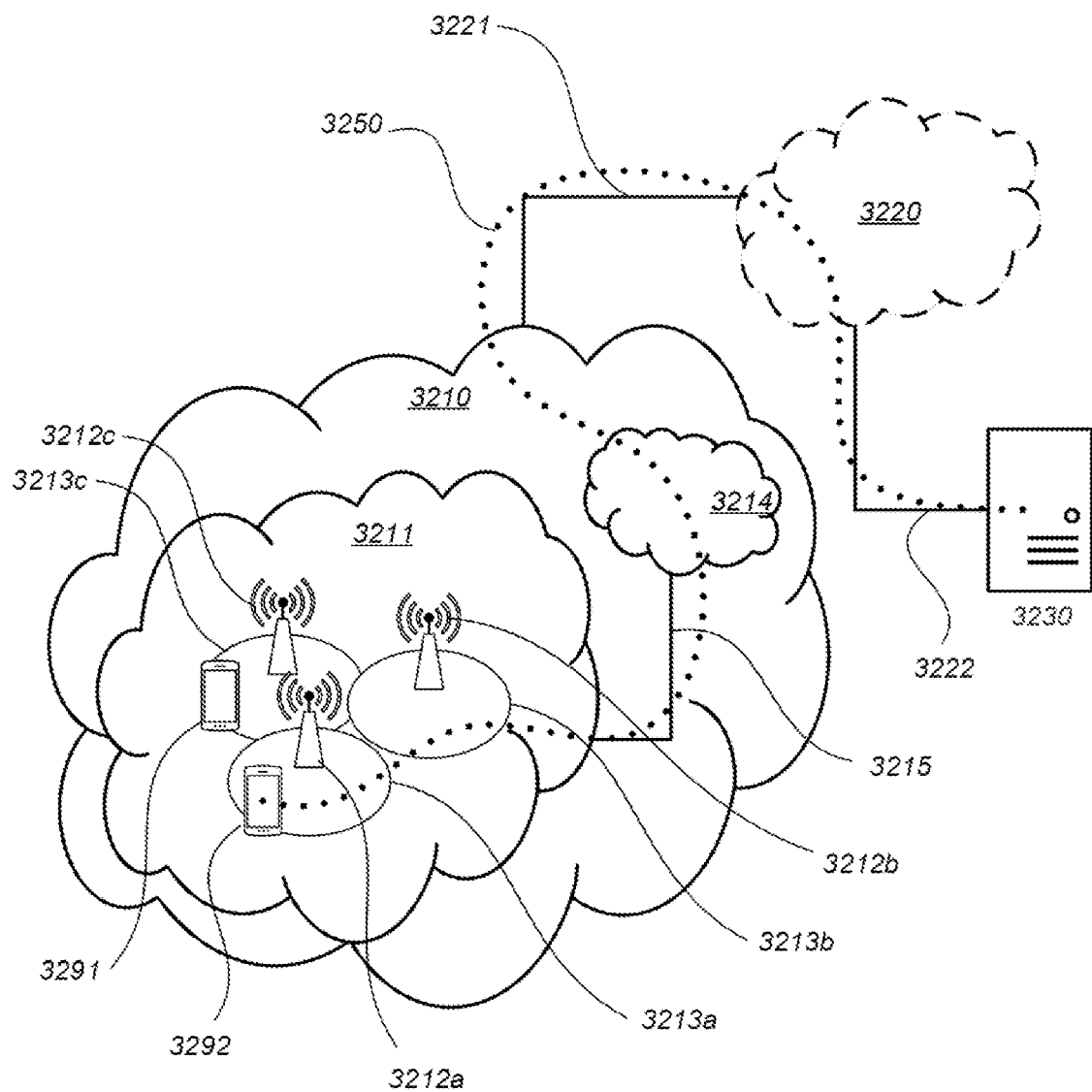
FIG. 8 schematically illustrates a telecommunication network connected via an intermediate network to a host computer.

With reference to FIG. 8, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212*a*, 3212*b*, 3212*c*, such as the radio network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the wireless devices 120 such as a Non-AP STA 3291 located in coverage area 3213*c* is configured to wirelessly connect to, or be paged by, the corresponding base station 3212*c*. A second UE 3292 e.g. the first or second radio node 110, 120 or such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
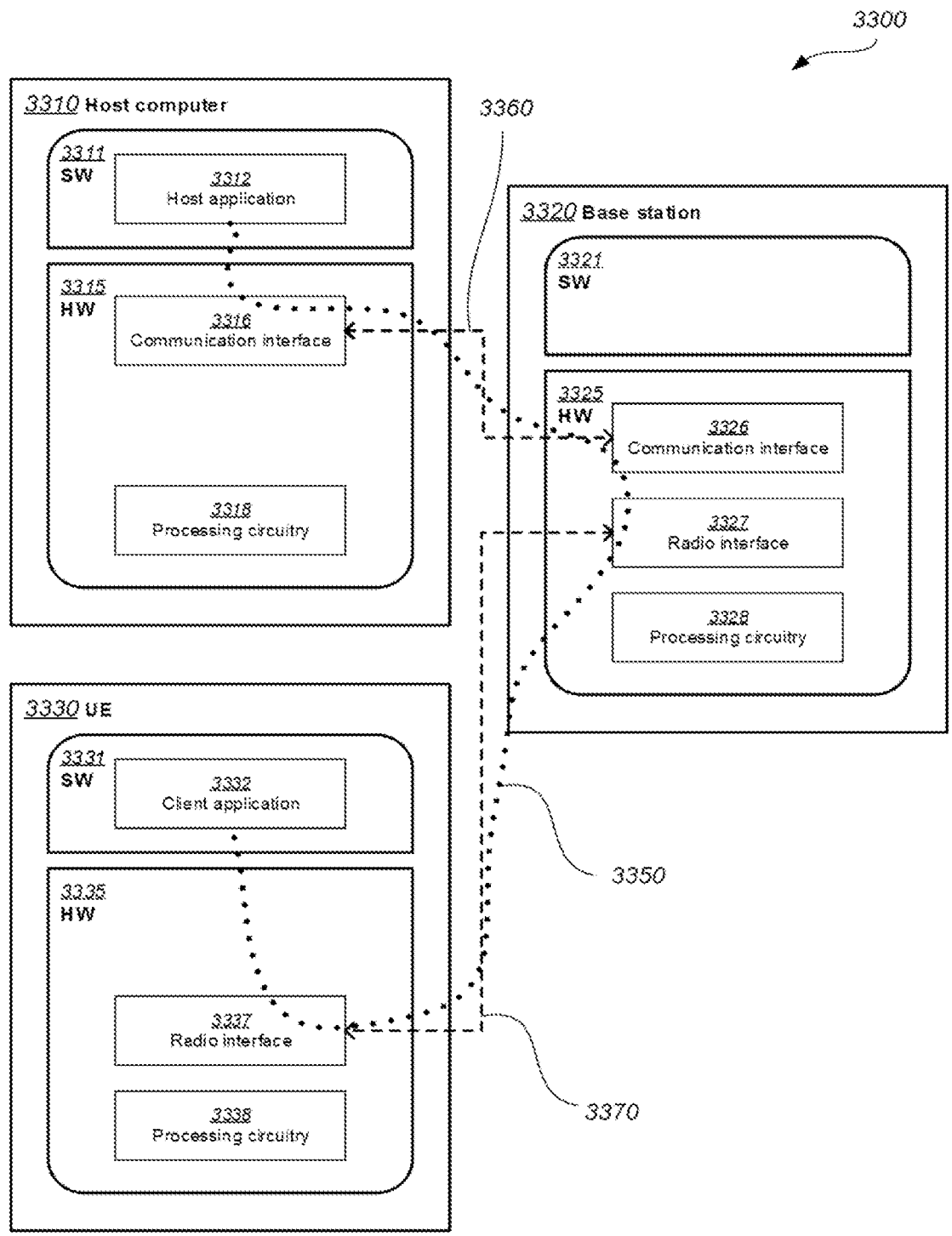
FIG. 9 is a generalized block diagram of a host computer communicating via a base station with a user equipment over a partially wireless connection.

It is noted that the host computer 3310, base station 3320 and UE 3330 illustrated in FIG. 9 may be identical to the host computer 3230, one of the base stations 3212*a*, 3212*b*, 3212*c* and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 10 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 11 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 11 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 12, 13:
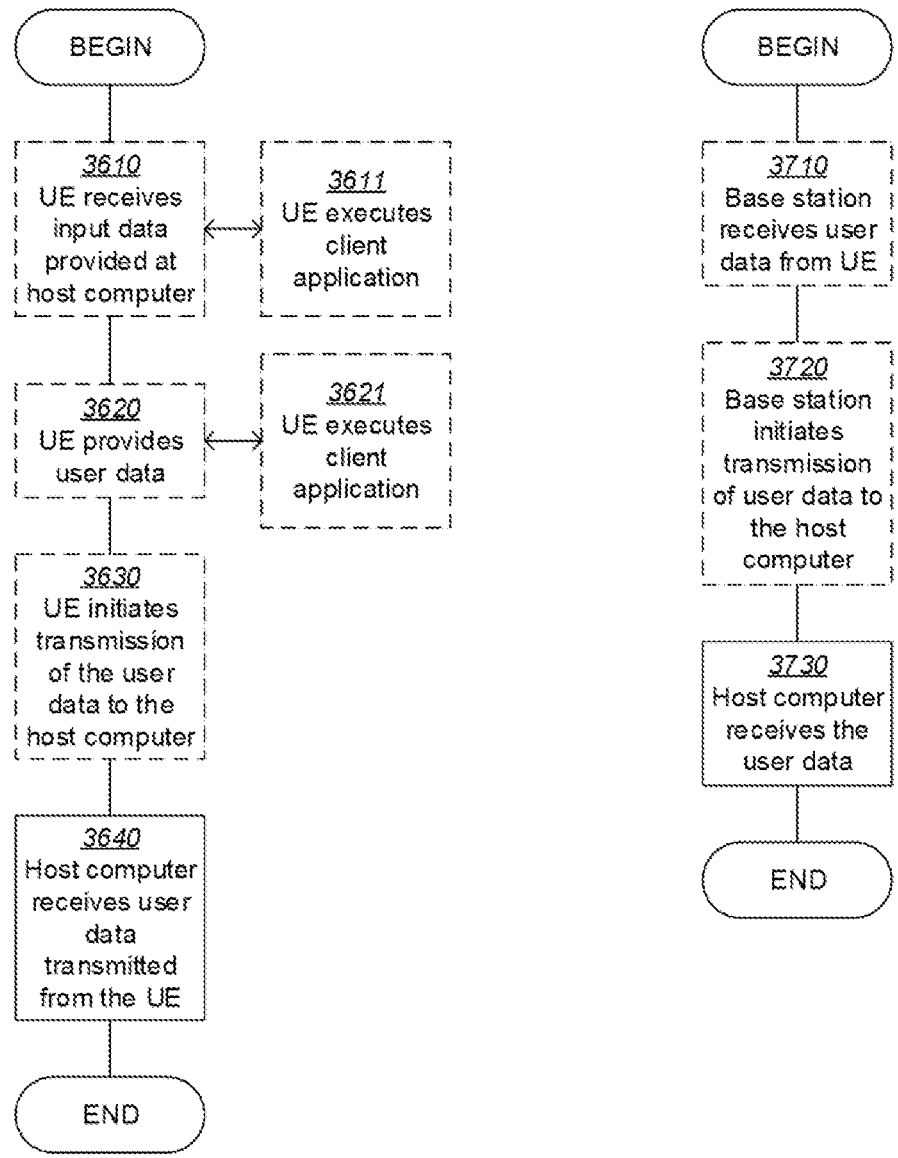

FIG. 12 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 12 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 13 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a first Service Communication Proxy, SCP, node for assisting a second SCP node in handling control plane traffic of a service related to a User Equipment, UE, in a wireless communication network, wherein a UE context is data related to the UE in a first Access and mobility Management Function, AMF, which UE context comprises a first Uniform Resource Identifier, URI, related to a Network Function, NF, service association, which first URI comprises:
   a first string related to the association, which first string represents a URI of an original resource in the NF, and
   a first SCP part as part of the first URI authority part related to the address of the first SCP node,
   the method comprising:
   at a relocation of the control plane traffic of the service from the first AMF passing the first SCP node relating to the control plane traffic of the service, towards a second AMF,
   changing the first URI to the URI of the original resource in the NF, in the UE context, and
   assisting the second SCP node in handling the control plane traffic of the service by sending, to the second SCP node, the UE context comprising the URI of the original resource in the NF, enabling the control plane traffic of the service from the second AMF to pass the second SCP node, for control plane traffic related to the resource in the NF.

2. The method according to claim 1, wherein changing comprises rewriting the first URI so that it points to the URI of the original resource.

3. A non-transitory computer readable storage medium including a computer program comprising instructions, which when executed by a processor, cause the processor to perform actions according to claim 1.

4. A method performed by a second Service Communication Proxy, SCP, node for handling control plane traffic of a service related to a User Equipment, UE, in a wireless communication network, the method comprising:
   at a relocation of the control plane traffic of the service from a first Access and mobility Management Function, AMF, passing a first SCP node related to the control plane traffic of the service, towards a second AMF,
   receiving, from the first SCP node, a UE context comprising a URI of the original resource in a Network Function, NF,
   changing the URI of the original resource in the NF to a second URI, in the UE context, which second URI is related to a NF service association, which second URI comprises:
   a second string related to the association, which second string represents the URI of the original resource, and
   a second SCP part as part of the second URI authority part, related to the address of the second SCP node,
   sending, to the second AMF, the UE context comprising the second URI, enabling the control plane traffic of the service from the second AMF to pass the second SCP node for control plane traffic related to the resource in the NF.

5. The method according to claim 4, wherein changing comprises rewriting the URI of the original resource in the NF so that it points to the second URI.

6. A non-transitory computer readable storage medium including a computer program comprising instructions, which when executed by a processor, cause the processor to perform actions according to claim 4.

7. A first Service Communication Proxy, SCP, node, configured to assist a second SCP node in handling control plane traffic of a service related to a User Equipment, UE, in a wireless communication network, wherein a UE context is adapted to be data related to the UE in a first Access and mobility Management Function, AMF, which UE context is adapted to comprises a first Uniform Resource Identifier, URI, related to a Network Function, NF, service association, which first URI is adapted to comprise:
- a first string related to the association, which first string is adapted to represent a URI of an original resource in the NF, and
- a first SCP part as part of the first URI authority part related to the address of the first SCP node, wherein the first SCP node is configured to:
- at a relocation of the control plane traffic of the service from the first AMF passing the first SCP node relating to the control plane traffic of the service, towards a second AMF,
- change the first URI to the URI of the original resource in the NF, in the UE context, and
- assist the second SCP node in handling the control plane traffic of the service by sending, to the second SCP node, the UE context adapted to comprise the URI of the original resource in the NF, enabling the control plane traffic of the service from the second AMF to pass the second SCP node, for control plane traffic related to the resource in the NF.

8. The first SCP node according to claim 7, wherein the changing the first URI to the URI of the original resource comprises rewriting the first URI so that it points to the URI of the original resource.

9. A second Service Communication Proxy, SCP, node, configured to handle control plane traffic of a service related to a User Equipment, UE, in a wireless communication network, wherein the second SCP node is configured to:
- at a relocation of the control plane traffic of the service from a first Access and mobility Management Function, AMF, passing a first SCP node related to the control plane traffic of the service, towards a second AMF,
- receive, from the first SCP node, a UE context adapted to comprise a URI of the original resource in a Network Function, NF,
- change the URI of the original resource in the NF to a second URI, in the UE context, which second URI is adapted to be related to a Network Function, NF, service association, which second URI is adapted to comprise:
  - a second string related to the association, which second string is adapted to represent the URI of the original resource, and
  - a second SCP part as part of the second URI authority part, related to the address of the second SCP node,
- send, to the second AMF, the UE context adapted to comprise the second URI, enabling the control plane traffic of the service from the second AMF to pass the second SCP node for control plane traffic related to the resource in the NF.

10. The second SCP node according to claim 9, wherein the changing the URI of the original resource in the NF to a second URI comprises rewriting the URI of the original resource in the NF so that it points to the second URI.

* * * * *